June 17, 1952 J. L. SOLOMON 2,600,519
SEQUENCE CONTROL CIRCUIT AND TIMER
Filed June 22, 1948 3 Sheets-Sheet 2

Fig. 3.

INVENTOR.
Julius L Solomon,
BY
Wilkinson, Huxley, Byron & Hume
attys.

June 17, 1952

J. L. SOLOMON 2,600,519

SEQUENCE CONTROL CIRCUIT AND TIMER

Filed June 22, 1948

INVENTOR.
Julius L. Solomon,
BY

Patented June 17, 1952

2,600,519

UNITED STATES PATENT OFFICE 2,600,519

SEQUENCE CONTROL CIRCUIT AND TIMER

Julius L. Solomon, Chicago, Ill., assignor to Welding Research, Inc., Chicago, Ill., a corporation of Illinois Application June 22, 1948, Serial No. 34,538

14 Claims. (Cl. 323—24)

The invention relates to electric control circuits and has reference in particular to an improved sequence control circuit and timer for controlling the supply of current from a polyphase source to respective circuit means through electric discharge devices.

The Sciaky Patent No. 2,431,083, granted November 18, 1947, discloses and claims an electric translating system for transferring energy from a polyphase alternating current source to a load circuit such as a welding circuit and wherein any one of three types of power may be secured in the welding circuit such as a single unidirectional current impulse, a series of unidirectional current impulses of the same polarity, or a series of current impulses, each impulse being opposite in polarity to the one immediately preceding it and so comprising a form of single phase alternating current. More particularly the three phase-three winding system of said patent employs reactance means in the form of primary windings in inductive relation with a secondary load circuit and wherein each primary winding has individual circuit connections to its respective phase of the polyphase source of supply with electric discharge devices of the ignitron type being provided for controlling the rectified current supplied to the windings respectively.

A general object of the invention is to provide a novel control circuit having improved operation for controlling the electric discharge devices in a power system as described wherein said discharge devices as groups are rendered conductive in an alternate manner to pass current to the primary windings for preset intervals with controllable periods of off time between each succeeding energization of the windings.

Another object of the invention is to provide a sequence control circuit of improved construction and operation for firing independent groups of ignitron tubes by grid control through thyratrons from a common control source. In the particular control circuit of the invention all of the cathodes of the tubes are connected to a common point and each group of grids controlling ignitron tubes conducting at the same time are also connected to common points respectively. The circuit operates to apply control potentials to the grid points and to the common cathode point so that it is relatively easy to fire each group of ignitrons alternately and to regulate the length of each conducting period, it being understood that the conducting period for one group of tubes will comprise the non-conducting period for the other group.

The invention has for a further object to provide a control system which will control the alternate firing of respective groups of ignitrons by regulating a control potential applied to a common cathode point and common grid points respectively and wherein the system includes inductive means of special construction for cancelling undesired voltages such as will develop in the grid-cathode circuits of the ignitrons and which would otherwise interfere with the control potential.

For cancelling the undesired voltages as above referred to it is necessary in the present control system that the ignitrons for each winding be located and connected approximately centrally of its winding so that the voltage conditions on all the cathodes will be substantially the same. It will be observed that this provides a symmetrical arrangement since the common cathode point A has electrical connection with the cathode of each ignitron by means of a substantially equivalent circuit.

Another object of the invention resides in the provision of an electronic control circuit for the purposes described which will incorporate means for regulating the start of each firing period with respect to the voltages appearing across the polyphase source of supply whereby to control the magnitude of the current delivered to the respective windings for each energizing impulse.

A further object is to provide a control circuit especially designed for controlling the firing of the ignitron tubes in a three phase-three winding system as described and which will incorporate safety means preventing the firing of the non-conducting group of tubes before the current passed by the conducting group has completely disappeared.

With these and various other objects in view the invention may consist of certain novel features of construction and operation as will be more fully described and particularly pointed out in the specification drawings and claims appended hereto.

In the drawings which illustrate an embodiment of the invention and wherein like reference characters are used to designate like parts—

Figure 1:
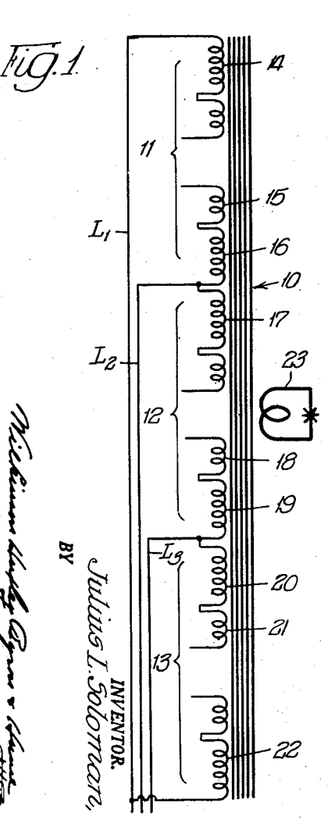
Figure 1 is a diagram illustrating in schematic form a welding system of the type shown in the Sciaky Patent No. 2,431,083 and which is representative of the systems to which the present control circuit has application.
Figure 2:
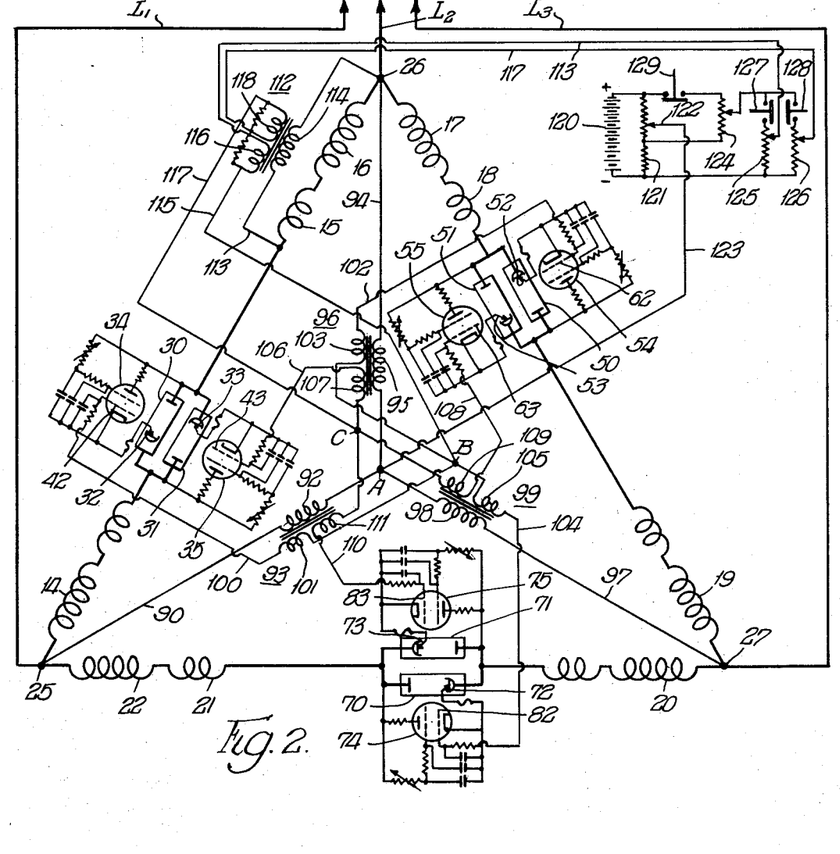
Figure 2 is a wiring diagram of a three phase-three winding system such as shown in Figure 1 illustrating the electronic elements and circuit connections for controlling the firing of the ignitron tubes.

Referring more particularly to Figures 1 and 2, the invention is illustrated as applied to a power system such as shown in the Sciaky Patent No. 2,431,083 previously mentioned and which may be described as a polyphase to single phase system. A characteristic of such a system resides in the use of an inductive device such as a transformer having a plurality of primary windings and a secondary winding. More particularly, as regards the system disclosed, the inductive device has three primary windings and which are individually connected to a phase of the three-phase source of supply. As shown in Figure 1 the leads $L_1$, $L_2$ and $L_3$ represent the conductors of the three-phase alternating current supply line and it will be seen that the transformer generally indicated by numeral 10 is provided with primary windings 11, 12 and 13, winding 11 having connection to conductors $L_1$—$L_2$, winding 12 having connection to conductors $L_2$—$L_3$, and winding 13 having connection to conductors $L_3$—$L_1$. Each primary winding may comprise a number of windings connected in series and for illustrative purposes three such windings have been shown although it is understood that a larger number may be employed. For example, with respect to primary winding 11 the same consists of windings 14, 15 and 16 connected in series relation. The intermediate winding 15 is divided and control means including electric discharge valves and their firing valves are electrically connected to the terminals of said intermediate winding. The construction of primary winding 12 is similar, the same including windings 17, 18 and 19, with control means being connected in series relation and interposed between the divided intermediate winding 18. Primary winding 13 is constructed similarly, including windings 20, 21 and 22, with the control means for the same being interposed between the divided intermediate winding 21. The secondary or load circuit of the transformer 10 is indicated by numeral 23, it being understood that the load circuit has inductive relation with the primary windings 11, 12 and 13.

In operation of the system as described, the control means for the various windings perform a controlling function so that a positive or negative half cycle of alternating current is supplied to the windings in sequence according to the phase relation of the electromotive forces in the three-phase supply line. For example, the discharge valves controlling the flow of current in primary winding 11 are rendered conductive so that a half cycle of current from the phase $L_1$—$L_2$ is supplied to said winding. Before the magnetizing effect of the flow of this current through the winding dies out the phase relation of the electromotive forces in the three-phase supply line is such that a half cycle of current from phase $L_2$—$L_3$ is supplied to winding 12, the electric discharge valves controlling this winding having been rendered conductive simultaneously with those for winding 11. Likewise the discharge valves for winding 13 are simultaneously rendered conductive and a half cycle of current is next caused to flow through this winding according to the phase relation of the electromotive forces in the supply line. Operation may be continued so that the magnetizing current impulses will flow in the same direction through the primary windings until the rise in the magnetic flux reaches a predetermined maximum, at which time the discharge valves are simultaneously rendered non-conductive. The rise in the magnetic flux has the effect of inducing a unidirectional current in the secondary circuit 23. In order for the magnetic flux to rise in a steady manner, current flow through the windings must be controlled by electric discharge valves which rectify the currents of the respective phases so that they have a unidirectional flow. Thus each magnetizing current impulse will flow through its primary winding in a direction to augment the magnetic flux and one impulse of unidirectional current is induced in the secondary circuit 23, the same comprising the combined output of the phases of the polyphase supply for that particular energization.

The sequence control and timer circuit of the invention is designed to regulate the firing of the various discharge valves and to maintain them conductive for the desired magnetizing period. It is required that such a control circuit renders sets or groups of discharge valves alternatively conductive so that the direction of flow of the magnetizing current impulses through the windings can be periodically reversed to generate a low frequency alternating current in the secondary load circuit. This is accomplished by the control circuit of the invention through the provision of common cathode and grid points, respectively, having connection with the grid-cathode circuits of the firing valves and which are provided to control the conductivity of the ignitrons constituting the electric discharge valves previously referred to. By applying control potentials to the cathode and grid points it is possible to render the sets of ignitrons conductive in an alternate manner and to conveniently regulate the length of the conducting period and the length of the offtime between said periods. One modification of the sequence control circuit and timer coming within the invention is shown schematically in Figure 2 which will now be described.

Figure 3:
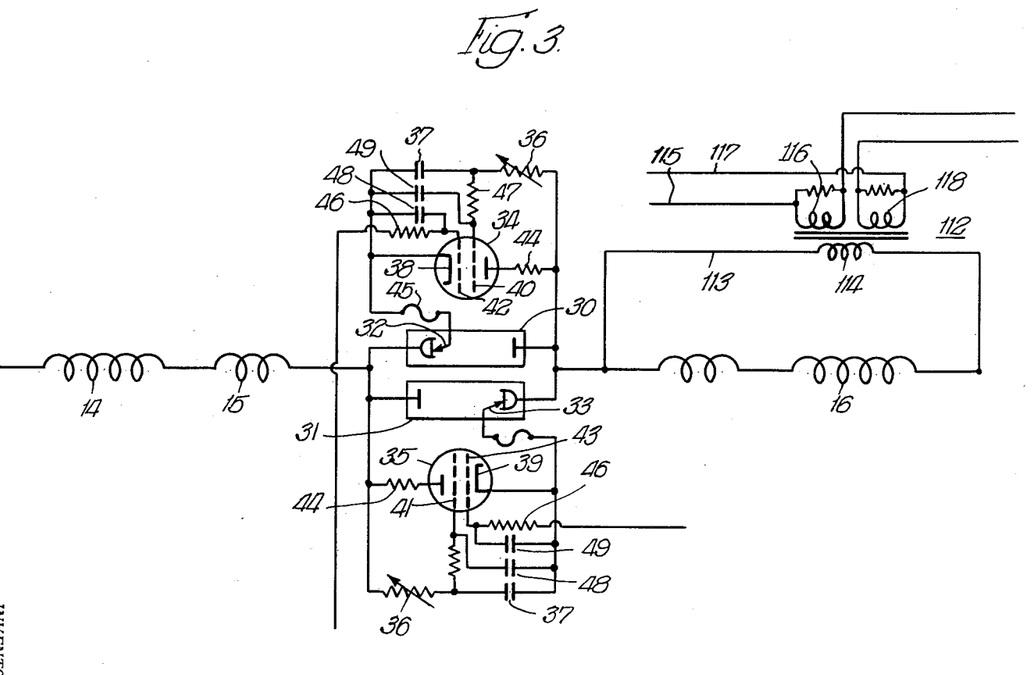
Figure 3 is a fragmentary wiring diagram showing one of the inductive circuits of Figure 2 with electric discharge valves and associated control elements in connected relation.

The lead $L_1$ of the three-phase power supply is connected to the terminal 25, whereas lead $L_2$ is connected to terminal 26 and $L_3$ to terminal 27. The primary winding 11 consisting of windings 14, 15 and 16 is connected between terminals 25 and 26. The primary winding 12 including windings 17, 18 and 19 is connected between terminals 26 and 27 and the winding 13 including windings 20, 21 and 22 is connected between terminals 27 and 25, the resulting circuit for the windings being known as a delta connection. The electric means controlling the flow of current through winding 11 essentially consists of a pair of ignitron tubes 30 and 31 connected in anti-parallel relation, each tube including an anode, a mercury cathode and a control electrode, the control electrode for tube 30 being indicated by numeral 32 and the control electrode for tube 31 being indicated by 33. Each ignitron tube has electrical connection with a firing valve which may comprise a thyratron 34 for ignitron tube 30 and a thyratron 35 for ignitron tube 31. As best shown in Figure 3 the phase shift circuit for thyratron 34 consists of a variable resistor 36 and a condenser 37. The voltage appearing across condenser 37 is applied between the cathode 38 and grid 40 of the thyratron 34. The voltage across said condenser 37 can be made to lead the voltage appearing across the plate-cathode of 34 by a number of degrees, dependent upon the adjustment of the variable resistor 36. When the value of this resistor is zero the voltage between cathode 38 and grid 40 is in phase with the voltage between the cathode and plate of said tube and full firing is realized from the moment 34 is rendered conductive by the application of the proper control voltage to the control grid 42. As resistor 36 is adjusted to increase the resistance, the angle of lead between the voltage applied to the grid 40 and the voltage applied to the plate is increased so that firing is delayed for a portion of the half cycle represented by the angle between the voltages applied to the grid and plate. A phase shifting circuit such as described is electrically connected to each thyratron and it will be understood that each such circuit additionally includes a resistance 44 for limiting the ignitor current flowing through the thyratron and a fuse 45 for protecting its ignitron tube against excessive dangerous currents which may result in the event of a hard starting ignitron. The limit resistor 46 is in series with the control grid 42, whereas 47 is a limit resistor in series with grid 40, and 48 and 49 are condensers connected between their respective grids and the cathode 38 for preventing sporadic firing of 34 due to transients on the line.

Control elements similar to that described above are also provided for primary winding 12 and likewise for primary winding 13. With respect to the control means for winding 12 it will be seen that the same is interposed in the intermediate winding 18 and consists of a pair of ignitron tubes 50 and 51 connected in anti-parallel relation, each tube including an anode, a mercury cathode and a control electrode, the same being indicated by numeral 52 for ignitron 50 and by numeral 53 for ignitron 51. Each ignitron tube has electrical connection with a firing valve comprising thyratrons 54 and 55. The circuit connecting the thyratrons to the ignitron tubes is the same as previously described and the thyratrons have control grids 62 and 63, respectively. The phase shift circuit for the thyratrons is identical to that as described with respect to primary winding 11 and repetition is not necessary.

For the primary winding 13 the ignitron tubes 70 and 71 are connected in anti-parallel relation between the intermediate winding 21 thereof and said ignitrons each have an anode, a mercury cathode, and a control electrode, the latter being designated by numerals 72 and 73, respectively. Thyratrons 74 and 75 constitute the firing tubes for controlling the conductivity of the ignitrons and said thyratrons have control grids 82 and 83, respectively. The circuit for the discharge valves and the firing valves for said winding 13 is identical with that described for the other windings, all of which is clearly evident from the disclosure of Figure 2.

From the foregoing description it will be seen that the control circuit of the invention provides two groups of ignitron tubes with independent firing circuits for each group. Since each pair of ignitrons is connected in back to back relation it will be seen that ignitrons 30, 50 and 70 constitute one group and that ignitrons 31, 51 and 71 constitute the second group. When ignitrons of the first group, namely, 30, 50 and 70, are conductive, magnetizing current impulses will flow through the primary windings in an upward direction, considering the windings as illustrated in Figure 1, and when the second group of ignitrons, namely, 31, 51 and 71, are rendered conductive the magnetizing current impulses will flow through said windings in a downward direction.

The thyratrons 34, 54 and 74 will control the firing of the first group of ignitrons and will maintain them conductive for a predetermined period of time, depending on the control of the thyratrons. In a similar manner thyratrons 35, 55 and 75 will control the second group of ignitron tubes and will maintain them conductive for a predetermined period of time, depending on the control of the thyratrons. In accordance with the invention the grid-cathode circuits of the firing valves are connected in parallel relation and in a manner to provide a common cathode point designated A, Figure 2, a common grid point designated B for the first group of thyratrons, and a common grid point designated C for the second group of thyratrons. In operation of the present control circuit and with all the tubes in the quiescent state common grid points B and C are held highly negative with respect to the common cathode point A, thus maintaining the ignitron tubes in a non-conducting state. When it is desired to render the first group of ignitron tubes conductive point B is made slightly positive with respect to point A and point C is maintained negative as before. Ignitron tubes 30, 50 and 70 are accordingly fired and maintained conductive for a period of time which is preset by the timing control to be presently described. At the end of this time point B is made negative with respect to point A as before and point C is made slightly positive. The ignitron tubes 31, 51 and 71 are now fired and they remain conductive for a preset period depending upon the adjustment of the timing control. The connections between points A, B and C and the various firing valves will now be described.

In order to provide a common cathode point a plurality of conductors are provided connecting with point A. The conductor 90 connects the terminal point 25 with A and includes the primary winding 92 of a transformer 93. Conductor 94 joins terminal point 26 with A and includes the primary winding 95 of the transformer 96. Conductor 97 connects terminal point 27 with A and includes the primary winding 98 of transformer 99. The connections of the conductors with the leads $L_1$, $L_2$ and $L_3$ serves to connect point A with the cathodes of all the valves. It is necessary that high impedance means be included in each conductor otherwise the windings 11, 12 and 13 would be short circuited. This accounts for the windings 92, 95 and 98. An alternating current voltage appears across each winding at all times. It is necessary to cancel out these voltages if the desired control voltages are to be impressed between the grid and cathode terminals of the firing valves.

The voltages developed across the primaries of the transformers 93, 96 and 99 are cancelled by providing said transformers with secondary windings connected to a control grid of a firing valve of each group. The control grid 42 of valve 34 is connected by conductor 100 with the secondary winding 101 and which is thus connected to point B. The control grid 62 is also connected to point B by conductor 102 which includes in its circuit the secondary winding 103. Also control grid 82 is connected by conductor 104 to point B with the secondary winding 105 being provided. The connections for the common grid point C include a conductor 106 joining the control grid 43 with the secondary winding 107 and then to point C. Conductor 108 includes the secondary winding 109 and joins the control grid 63 with point C. Likewise conductor 110 includes the secondary winding 111 and joins the control grid 83 with point C.

The transformers 93, 96 and 99 are therefore each provided with two secondaries having connection with certain control grids and with the common grid points B and C, respectively. The transformers are especially constructed for the purpose and are on the order of low frequency transformers having a large number of turns and with a one to one ratio existing between the turns of the primary winding and each secondary winding. For example, the primary 92 has the same number of turns as the secondary 101 and so on. The effect is to cancel the voltages existing across the primaries by an equal and opposite voltage induced across the secondaries. The firing valves will thus have impressed between the grid and cathode terminals thereof whatever control voltages are applied to the points A and B and A and C.

During the conducting periods for the groups of ignitron tubes another condition exists in the primary windings 11, 12 and 13, namely, a direct current voltage appears across each winding. This will be understood by observing Figure 2 which clearly shows each primary winding connected in series relation with the cathode circuit of its respective valves. For reasons above explained it is necessary to cancel this direct current voltage developed across each primary winding due to flow of current in the same, and according to the invention this is done by means of a transformer 112 having a primary winding and two secondary windings. The conductor 113 connects the primary winding 114 across the windings 15 and 16, as shown in Figure 2, of the primary winding 11. The conductor 115 connects one secondary winding 116 with the voltage source and with the grid point B. The other conductor 117 connects the secondary winding 118 with the voltage source and with the grid point C. The voltage developed across the secondaries is equal and opposite to the direct current voltage across each half section of a primary winding, such as windings 15 and 16, for example, and which is in series relation with the grid-cathode circuit of its respective control valves. Transformer 112 is of the special type as described with a one to one ratio between primary and secondary windings. Without it the following action would result. One group of tubes may be made conductive and the same would pass current through its particular winding. As flow of current continued the voltage developed in the particular winding of transformer 10 and connected to the cathode of each tube would bring the grids negative with respect to the cathode and this would render the tubes non-conducting. The secondary windings 116 and 118 are introduced in the respective grid circuits and in this way they cancel the undesired voltages and the thyratron tubes are completely responsive to the control voltages applied to points B and C.

In the present system for alternately firing the respective groups of ignitrons it will be observed that the primary windings 11, 12 and 13 of the welding transformer 10 are delta connected and that the conductors 90, 94 and 97 are star connected so as to provide the common cathode point A. A feature of the invention resides in the symmetrical electrical hook-up of the ignitrons and wherein each pair in back to back relation has connection with its respective primary winding approximately centrally of the winding. Accordingly, the voltage condition from the line to each cathode is substantially the same and the common cathode point A has electrical connection with the cathode of each ignitron by means of an equivalent circuit.

A system for introducing control voltages to points A, B and C is shown in connection with Figure 2. Numeral 120 indicates a source of direct current such as a battery, the positive and negative terminals of which are connected by the resistance 121. The finger 122 of the voltage divider is connected by the conductor 123 to point A and this point is maintained positive by locating the finger 122 toward the positive end of the battery. Slide wire resistors 124, 125 and 126 are provided as shown, each having connection across the battery 120. Contactors 127, 128 and 129 may be operated by some means of timing. With all contactors open the voltage of points B and C with respect to A is highly negative, thus maintaining the grids of all tubes in a hold-off condition. If the group of ignitrons 30, 50 and 70 are to be rendered conductive, the contactors 127 and 129 are closed for the duration of the on-time period, after which 127 and 129 are opened, bringing all the ignitrons to a non-conductive condition again. The contactors 128 and 129 are then closed so that the ignitrons 31, 51 and 71 are made conductive and the contactors are held closed for the on-time period. Alternate firing of the tubes can be accomplished by relays, step by step switches, or by fully electronic controls with no moving parts. A preferred system of fully electronic elements is shown in Figure 4 which will now be described.

Figure 4:
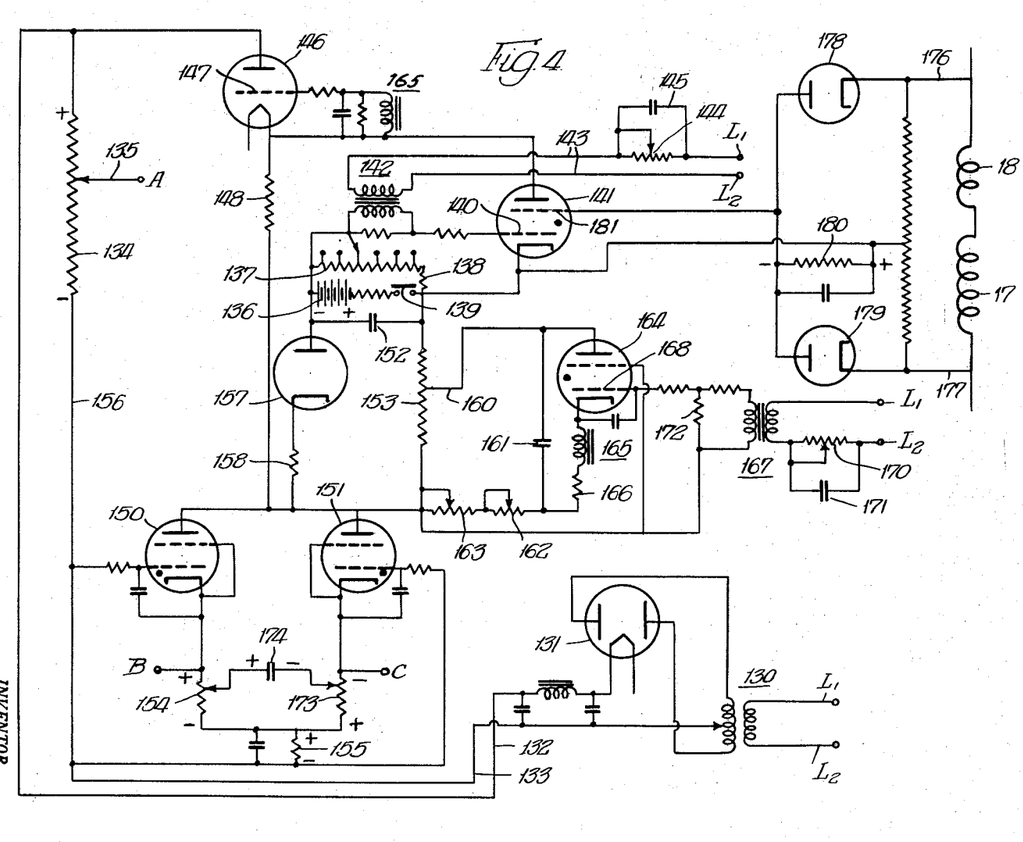
Figure 4 is a schematic wiring diagram of a modified timing circuit of the electronic type coming within the invention.

The transformer 130, Figure 4, is electrically connected on its input side to a source of alternating current indicated by leads L₁ and L₂. On its output side the transformer 130 connects with a full wave rectifier 131 which supplies direct current through the leads 132 and 133 to the voltage divider indicated by numeral 134, the same being connected by the conductor 135 to the common cathode point A and which connection can be adjusted in order that the potential applied to point A can be made sufficiently positive to secure the desired mode of operation. A battery 136 or other suitable source of direct current is connected across the resistance 137, provided with a plurality of adjustable taps, and across the resistance 138 in series therewith. The initiating contact 139 is located in series with the battery 136. The negative end of the battery is connected to the grid 140 of the gas filled, grid controlled tube 141 and accordingly the said tube is maintained in a non-conductive state when the contact 139 is closed. In the grid cathode circuit of the tube 141 there is also applied peak voltages from the secondary of the peaking transformer 142 connected by conductors 143 to a source of alternating current indicated by leads L₁ and L₂. A phase shifting circuit including the potentiometer 144 and the condenser 145 is connected with one of said conductors.

In operation of the circuit it will be seen that current will flow from the positive end of resistance 134 through the vacuum tube 146 having the control grid 147, through the resistance 148 in the cathode circuit of said tube and then through either the gas filled, grid controlled tube 150 or 151, depending on which tube is conducting since only one tube can conduct at the same time. Assuming that the tube 150 has been conducting and the initiating contact 139 is opened, the condenser 152, which was charged to the voltage appearing across the battery 136, starts to discharge through the resistances 137 and 138. One of the positive peaks generated by peaking transformer 142 will presently bring the grid of tube 141 sufficiently positive so that the tube will become conductive. Current will now take a second path from the cathode of tube 146, namely, through the plate to cathode of tube 141, through resistance 153, through 150, plate to cathode of the same, through resistance 154, through resistance 155, to the negative end of the resistance 134 by means of conductor 156.

A third path for current flow from the cathode of tube 146 will be through tube 141, plate to cathode, through the parallel circuit including the resistances 137, 138 and the condenser 152, through the vacuum tube 157, plate to cathode, through the resistance 158, tube 150, resistances 154 and 155, to the negative end of resistance 134 by means of conductor 156. A fourth path for said current flow will be from the cathode of tube 141 through a portion of the resistance 153 to the slider 160 connecting therewith, through the condenser 161, through adjustable resistances 162 and 163, through tube 150, resistances 154 and 155 to conductor 156, and returning to the negative end of 134.

The additional current flowing through 154 increases the voltage drop across this resistance and makes the grid point B connecting therewith more positive than it was in the quiescent state. During passage of this current point B is brought to the same potential as point A, whereas point C remains substantially at the same negative potential with respect to point A as it was during the quiescent state. As the condenser 161 charges by current flowing through the resistances 163 and 162 the voltage across this condenser rises exponentially, at the same time the voltage across the resistances 162 and 163 is dropping exponentially.

In examining the grid-cathode circuit of the gas filled grid controlled tube 164 we find the cathode circuit includes the primary winding of a transformer 165 and a resistance 166 in series with resistances 162 and 163. A peaking transformer 167 is also electrically connected with the control grid 168 of said tube 164, the peaking transformer having electrical connection with the leads L1 and L2 of a source of alternating current. The potentiometer 170 and the condenser 171 represent a phase shift circuit in series relation with the power input circuit of the peaking transformer 167. The voltages of the grid-cathode of tube 164 are therefore the voltages across 162 and 163, the negative end of which is connected to the grid 168, and the peaked voltage across resistance 172. As the condenser 161 charges, the voltage from plate to cathode rises and at the same time the voltage between cathode and grid is becoming less negative. A point is finally reached at which one of the peak voltages will cause the tube 164 to conduct. The tube will discharge the condenser 161 through resistance 166 and the primary of transformer 165. This discharge current generates a pulse voltage in the secondary of transformer 165 located in the grid-cathode circuit of tube 146. The grid 147 of this tube is driven highly negative, thus stopping the flow of current through the tube and through the rest of the circuit momentarily.

When the pulse, which is a few micro seconds in duration is over, tube 146 becomes conductive again and current flows through 148, through tube 151, through resistances 173 and 155 to the negative side of 134. The switch from tube 150 to 151 is effected in this manner. While tube 150 is conducting the condenser 174 is charged to the voltage drop across 154 with polarities as indicated, the positive end to the cathode of tube 150 and the negative end to the cathode of tube 151. The voltage drop across 155 maintains the grid of tube 151 negative with respect to its cathode. At the instance the negative pulse is received by the grid of tube 146 and current ceases to flow, the condenser 174 starts to discharge through variable resistors 154 and 173 with instantaneous polarities as indicated. The terminal of 154 connected to the cathode of 150 is positive. The end connected to the grid of 150 is negative. Therefore the voltage between cathode and grid is the sum of the voltage across 154 and 155 with the negative connected to the grid. This prevents tube 150 from conducting.

The voltages in the grid-cathode circuit of tube 151 are as follows: From the cathode of tube 151 to the negative end of the voltage drop across 173, the positive end of 173 being connected to the positive end of 155 with the negative end being connected to the grid of tube 151. Since the voltage drop across 173 is greater than that across 155 the net voltage between grid and cathode of tube 151 will be the difference between these two voltages, with the grid now being positive with respect to the cathode. When tube 146 becomes conductive again after the pulse is passed, the tube 151 conducts the current and tube 150 is maintained non-conducting.

After condenser 161 has discharged through tube 164, the tube 141 is held non-conductive by virtue of the charge on condenser 152 which holds the grid of tube 141 negative with respect to its cathode. The condenser 152 is discharged at an exponential rate by resistances 137 and 138 in series. As the voltage across 152 drops off, a point will finally be reached at which one of the peaks from peaking transformer 142 will make tube 141 conductive and it will cause current to flow along the paths previously described.

During the time condenser 161 is charging, the potential difference between points A and C will be zero but the potential between points A and B will remain substantially the same as for the off-time period, thus keeping the firing valves which are controlled by the grids to which point B is connected in the non-conducting state, whereas those valves whose grids are connected to point C are made conductive. After the on-time period which is regulated by adjustment of 162 and 163, the condenser 161 discharges and point C is again brought to a high negative potential with respect to point A, thus making both groups of firing valves non-conductive. This condition remains until condenser 152 discharges through 137, the off-time adjustment potentiometer.

The position of the peaked secondary voltage across the winding of transformer 142 may be shifted with respect to the line voltage wave by adjustment of 144 in the phase shifting network connected to this transformer. This provides adjustment of the point at which the firing starts.

The position of the peak in the secondary of transformer 167 may be adjusted by varying 170 in the phase shifting network connected to this transformer. Both peaks may be shifted independently or may be adjusted from one phase shift network simultaneously.

In order to prevent the re-ignition of tube 141 before the current through the windings of transformer 10 has entirely disappeared, the invention provides a protective circuit, shown in Figure 4, in electrical connection with the timing circuit of said figure. The conductors 176 and 177 are connected across a part of a primary winding of the welding transformer 10 such as the coils 17 and 18. While current is flowing through these coils, the voltage across the same is rectified by tubes 178 and 179 producing a voltage drop across resistance 180 which will have the polarity as indicated. The negative end of this resistor is connected to the grid of tube 141 and thus the peak voltages from the transformer 142 are prevented from firing tube 141 until the voltage disappears entirely across the resistance 180. As soon as this voltage disappears, the next positive pulse of the peaking transformer 142 will fire the tube 141, provided the condenser 152 has sufficiently discharged to allow the circuit to function in the manner previously described.

As a summary of the present timing circuit it can be pointed out that operation is initiated by opening the contact 139. Current flows through the single path including the resistance 148 and will continue to flow only through this one path until condenser 152 discharges sufficiently to cause tube 141 to fire. Current then flows through a plurality of paths and the firing of 141 starts the on-time period. During this period both condensers 152 and 161 are charged, the charging of 152 taking place rapidly and the charging of 161 depending on the adjustment of 162 and 163. When 161 discharges by the firing of tube 164 it ends the on-time period. With the end of the period current flow is stopped which results in switching from tube 150 to 151 or vice versa. The off-time period then begins and current flows through the single path again, the period being determined by the discharging of condenser 152. By adjusting the taps on resistance 137 this off-time period can be varied.

It is to be understood that many other uses and applications of the invention will be apparent to those skilled in the art and it is not desired that this invention be limited to the details described for its scope includes all such forms or improvements as come within the spirit of the following claims construed as broadly as the prior art will permit.

What is claimed is:

1. In a control circuit, the combination with a source of polyphase alternating current, of an inductive device having primary windings corresponding in number to the phases of the alternating current source, circuit means connecting each winding to its respective phase of said source, at least one electric discharge valve for each winding in series circuit relation for controlling the flow of current through the winding, a firing valve for each electric discharge valve for rendering its discharge valve conductive when the firing valve is conductive, each firing valve having an anode, a cathode and a control grid, means electrically connecting the grid-cathode circuits of the firing valves in parallel relation and in a manner to provide common grid and cathode points respectively, and means for applying a control potential to said points whereby to control the conductivity of the firing valves and thus the conductivity of the electric discharge valves.

2. In a control circuit, the combination with a source of polyphase alternating current, of an inductive device having primary windings corresponding in number to the phases of the alternating current source, circuit means connecting each winding to its respective phase of said source, at least one electric discharge valve for each winding in series circuit relation therewith for controlling the flow of current through the winding, a firing valve for each electric discharge valve for rendering its discharge valve conductive when the firing valve is conductive, each firing valve having an anode, a cathode and a control grid, means connecting the grid-cathode circuits of the firing valves in parallel relation and in a manner to provide common grid and cathode points, respectively, means for applying a control potential to said points whereby to control the conductivity of the firing valves and thus the conductivity of the electric discharge valves, and inductive means in each grid-cathode circuit for cancelling the effect of any voltage generated in the circuit such as would interfere with the application of the control potential to the grid and cathode terminals of the firing valves.

3. In a control circuit, the combination with a source of polyphase alternating current, of an inductive device having primary windings corresponding in number to the phases of the alternating current source, circuit means connecting each winding to its respective phase of said source, at least one electric discharge valve interposed in each winding in series circuit relation therewith for controlling the flow of current through the winding, a firing valve for each electric discharge valve for rendering its discharge valve conductive when the firing valve is conductive, each firing valve having an anode, a cathode and a control grid, circuit control means providing a common grid point in electrical connection with the control grid of each firing valve, said means additionally providing a common cathode point in electrical connection with the cathode of each firing valve, means for applying a control potential between said grid and cathode points, and inductive means in each grid-cathode circuit for cancelling the effect of any voltage generated in the circuit such as would interfere with the application of the control potential to the grid and cathode terminals of the firing valves.

4. In a control circuit, the combination with a source of polyphase alternating current, of a single inductive device having primary windings corresponding in number to the phases of the alternating current source, circuit means connecting each winding across its respective phase of said source, a pair of electric discharge valves connected in back to back relation and connected in each winding in series circuit relation therewith for controlling flow of current through the winding, whereby the electric discharge valves comprise two groups according to direction of current flow with each group having a valve in each winding, a firing valve for each electric discharge valve in associated circuit relation therewith for rendering its discharge valve conductive when the firing valve is conductive, each firing valve having an anode, a cathode and a control grid, control circuit means connecting the grid-cathode circuits of each group of firing valves in parallel relation and in a manner to provide a common grid point for each group and a cathode point common to both groups, means for applying control potentials between said cathode point and the grid points respectively, and inductive means in each grid-cathode circuit for cancelling the effect of any voltage generated in the circuit such as would interfere with the application of the control potentials to the grid and cathode terminals of the firing valves.

5. In a control circuit, the combination with a source of polyphase alternating current, of an inductive device having primary windings corresponding in number to the phases of the alternating current source, circuit means connecting each winding across its respective phase of said source, a pair of electric discharge valves connected in back to back relation and interposed in each winding in series circuit relation therewith for controlling flow of current through the winding, whereby the electric discharge valves comprise two groups according to direction of current flow with each group having a valve in each winding, a firing valve for each electric discharge valve in associated circuit relation therewith for rendering its discharge valve conductive when the firing valve is conductive, each firing valve having an anode, a cathode and a control grid, control circuit means providing two common grid points electrically connected to the grids of their respective group of firing valves, a common cathode point also provided by said control circuit means and electrically connected to the cathodes of both groups of firing valves, means for applying control potentials between said common cathode point and said grid points respectively, and inductive means in each grid-cathode circuit for cancelling the effect of any voltage generated in the circuit such as would interfere with the application of the control potentials to the grid and cathode terminals of the firing valves, the said means for applying the control potentials operating to apply to each group of firing valves first a blocking potential to maintain the firing valve non-conductive and then an energizing potential, whereby the firing valves and thus the electric discharge valves can be rendered alternately conductive as regards groups.

6. In a control circuit, the combination with a source of polyphase alternating current, of an inductive device having primary windings corresponding in number to the phases of the alternating current source, circuit means connecting each winding across its respective phase of said source, a pair of electric discharge valves connected in back to back relation and interposed in each winding in series circuit relation therewith for controlling flow of current through the winding, whereby the electric discharge valves comprise two groups according to the direction of current flow with each group having a valve in each winding, a firing valve for each electric discharge valve for rendering its discharge valve conductive when the firing valve is conductive, each firing valve having an anode, a cathode and a control grid, circuit control means providing two grid points, conductors connecting the grids of one group of firing valves to one of said grid points, other conductors connecting the grids of the other group of firing valves to the second grid point, a common cathode point also provided by the circuit control means, the cathode circuits of the firing valves each including part of its respective primary winding in addition to a conductor electrically connecting with the cathode point, and means inductively connecting each cathode circuit with the grid circuit of a firing valve for each group whereby to cancel the effect of undesired voltages generated in the cathode circuits.

7. A control circuit of the character as defined by claim 6, additionally including means for applying control potentials between said common cathode point and the grid points respectively, to independently control the conductivity of each group of firing valves, said control potential applying means including conductors connecting with the grid points respectively, and inductive means in each conductor having inductive relation with one of the primary windings for cancelling the effect of any direct current voltage developed across the windings as a result of current flow in the windings and which would otherwise interfere with said control potentials.

8. In a control circuit, the combination with a source of polyphase alternating current, of a transformer having a secondary load circuit and having individual primary windings corresponding in number to the phases of the alternating current source, circuit means electrically connecting each winding across the respective phase of the alternating current source, a pair of electric discharge valves in back to back relation interposed in each winding and having a series circuit relation therewith, one valve of each pair controlling the flow of current through the winding in one direction and the other valve of each pair controlling the flow of current through the winding in an opposite direction, whereby the electric discharge valves comprise two groups with each group having a valve in each winding, electronic timing mechanism alternately rendering each group of valves conductive as a unit, and adjustable means included in said timing mechanism for timing the conductive periods and for also timing the interval between conductive periods independently thereof.

9. In a control circuit, the combination with a source of polyphase alternating current, of a transformer having a secondary load circuit and having individual primary windings corresponding in number to the phases of the alternating current source, circuit means electrically connecting each winding across the respective phase of the alternating current source, a pair of electric discharge valves in back to back relation for each winding and having a series circuit relation therewith, one valve of each pair controlling the flow of current through the winding in one direction and the other valve of each pair controlling the flow of current through the winding in an opposite direction, whereby the electric discharge valves comprise two groups with each group having a valve in each winding, a firing valve for each electric discharge valve for controlling the conductivity of the discharge valve, each firing valve having an anode, a cathode and a control grid, control circuit means electrically connecting the grids of each group of firing valves in parallel relation and in a manner to provide a common grid point for each group, said control circuit means providing a common cathode point having electrical connection to the cathodes of all the firing valves, electronic timing mechanism rendering each group of valves conductive in an alternate manner by applying blocking and energizing potentials alternately between the cathode point and each grid point respectively, and means inductively connecting each cathode circuit with the grid circuit of a valve for each group whereby to cancel the effect of undesired voltages generated in the cathode circuits.

10. In an electrical system for resistance welding, the combination with a source of polyphase alternating current, of an inductive device having primary windings corresponding in number to the phases of the alternating current source, circuit means connecting each winding across its respective phase of said source, a pair of electric discharge valves connected in back to back relation and interposed in each winding in series circuit relation therewith for controlling flow of current through the windings, a firing valve of the grid control type for each discharge valve for rendering its discharge valve conductive when the firing valve is conductive, each firing valve including an anode, a cathode and a control grid, circuit control means providing a first grid point having electrical connection to the grids of certain firing valves, a second grid point having electrical connection to the grids of the remaining firing valves, a common cathode point electrically connected to the cathodes of all the firing valves, and means applying control potentials between said cathode point and the grid points respectively, whereby to control the conductivity of the firing valves and thus the discharge valves, each pair of electric discharge valves having electrical connection to its winding substantially centrally of the winding so that the voltage conditions from the source to the cathode of each discharge valve will be substantially the same.

11. In an electrical system for resistance welding, the combination with a source of three-phase alternating current, of a welding transformer having a secondary load circuit and individual primary windings corresponding in number to the phases of the alternating current source, said windings being connected in delta relation and circuit means for each winding individually connecting the winding across its respective phase of said source, a pair of electric discharge valves connected in back to back relation and interposed in each winding in series circuit relation therewith for controlling the flow of current through the winding, a firing valve for each discharge valve for rendering its discharge valve conductive when the firing valve is conductive, each firing valve having an anode, a cathode and a control grid, circuit control means providing a first common grid point and a second common grid point, conductors joining the first common grid point with the grids of certain of the firing valves, other conductors joining the second common grid point with the grids of the remaining firing valves, a common cathode point electrically connected to the windings and to said alternating current source by a star connection so that the cathode circuits from said point to the cathode of each firing valve are substantially identical, and means for applying control potentials between the common cathode point and the grid points respectively for controlling the conductivity of the firing valves and thus the discharge valves.

12. An electrical system for resistance welding as defined by claim 11, additionally including inductive means in each cathode circuit in associated relation with similar inductive means in one of said conductors and in one of said other conductors for cancelling the effect of any voltage in the cathode circuit such as would interfere with the control potentials.

13. In a control circuit, the combination with a plurality of primary windings of a transformer, a pair of electric discharge valves in back to back relation and in series circuit relation with each winding, a firing valve for each electric discharge valve for controlling the conductivity of the discharge valve, each firing valve having an anode, a cathode and a control grid, grid circuits connecting the grids of certain firing valves to a first grid point, other grid circuits connecting the grids of the remaining firing valves to a second grid point, a common cathode point electrically connected to the cathodes of all the firing valves, means for applying control potentials between the common cathode point and the grid points, respectively, and inductive means in each cathode circuit in associated relation with similar inductive means in one of said grid circuits and in one of said other grid circuits for cancelling the effect of any voltage in the cathode circuit such as would disturb the control potentials.

14. A control circuit of the character as defined by claim 13, wherein the control potential applying means includes conductors connecting with the grid points respectively, and inductive means in each conductor having inductive relation with one of the primary windings for cancelling the effect of any direct current voltage developed across the windings as a result of current flow in the windings and which would otherwise disturb the control potentials.

JULIUS L. SOLOMON.

REFERENCES CITED

The following references are of record in the file of this patent:

UNITED STATES PATENTS

| Number | Name | Date |
|---|---|---|
| 2,200,077 | Dawson | May 7, 1940 |
| 2,313,957 | Myers | Mar. 16, 1943 |
| 2,384,937 | Livingston | Sept. 18, 1945 |
| 2,430,640 | Johnson | Nov. 11, 1947 |
| 2,431,083 | Scioky | Nov. 18, 1948 |